United States Patent
Zavgren, Jr. et al.

(10) Patent No.: US 6,711,409 B1
(45) Date of Patent: Mar. 23, 2004

(54) NODE BELONGING TO MULTIPLE CLUSTERS IN AN AD HOC WIRELESS NETWORK

(75) Inventors: John R. Zavgren, Jr., Acton, MA (US); Joseph J. Weinstein, Somerville, MA (US); Subramanian Ramanathan, Concord, MA (US); Isidro Marcos Castineyra, Somerville, MA (US); Brig Barnum Elliott, Arlington, MA (US); William S. Passman, Lexington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/513,757

(22) Filed: Feb. 25, 2000

Related U.S. Application Data

(60) Provisional application No. 60/170,751, filed on Dec. 15, 1999.

(51) Int. Cl.⁷ .................................................. H04Q 7/20
(52) U.S. Cl. ...................... 455/445; 455/571; 455/11.1; 455/13.1; 370/335; 370/242
(58) Field of Search ................................ 455/571, 11.1, 455/445, 13.1, 422, 450, 458, 446, 449, 560, 442, 65; 370/254, 238, 351, 338, 335, 342

(56) References Cited

U.S. PATENT DOCUMENTS

| | | | |
|---|---|---|---|
| 4,718,002 A | | 1/1988 | Carr .......................... 364/200 |
| 4,864,559 A | * | 9/1989 | Perlman ...................... 370/60 |
| 5,093,824 A | | 3/1992 | Coan et al. .................. 370/16 |
| 5,155,859 A | | 10/1992 | Harris et al. ............... 455/51.2 |
| 5,243,592 A | | 9/1993 | Parlman et al. ............... 370/17 |
| 5,497,368 A | * | 3/1996 | Reijnierse .................... 370/54 |
| 5,551,056 A | | 8/1996 | Koponen et al. ............... 455/8 |
| 5,652,751 A | * | 7/1997 | Sharony ...................... 370/227 |
| 5,659,544 A | | 8/1997 | La Porta et al. ............. 370/312 |
| 5,850,592 A | | 12/1998 | Ramanathan ................... 455/7 |
| 5,881,246 A | | 3/1999 | Crawley et al. ........ 395/200.68 |
| 5,913,921 A | | 6/1999 | Tosey et al. ................. 709/220 |
| 5,966,668 A | * | 10/1999 | Lindroth ..................... 455/446 |
| 6,026,077 A | * | 2/2000 | Iwata ........................ 340/2.23 |
| 6,028,857 A | * | 2/2000 | Poor .......................... 370/351 |
| 6,046,978 A | * | 4/2000 | Melnik ....................... 370/221 |
| 6,049,720 A | * | 4/2000 | Rude ......................... 455/503 |
| 6,115,580 A | * | 9/2000 | Chuprun ........................ 455/1 |
| 6,205,117 B1 | * | 3/2001 | Doshi et al. ................. 370/225 |
| 6,304,556 B1 | * | 10/2001 | Haas ......................... 370/254 |
| 6,304,745 B1 | * | 10/2001 | Monch ....................... 455/13.1 |
| 6,317,436 B1 | * | 11/2001 | Young et al. ................ 370/443 |
| 6,430,150 B1 | * | 8/2002 | Azuma et al. ........... 340/825.01 |

OTHER PUBLICATIONS

"Link–State Routing," John Moy, Ch. 5, "Routing in Communication Networks," ed. Martha Steenstrup, Prentice Hall, 1995.*

(List continued on next page.)

*Primary Examiner*—Edward F. Urban
*Assistant Examiner*—Khawar Iqbal
(74) *Attorney, Agent, or Firm*—Leonard C. Suchtya, Esq.; Michael P. Sandonsto, Esq.; Joel Wall

(57) ABSTRACT

A communication system has stations arranged in clusters of member stations, each of which communicates with the other member stations. One member station is a head station of the cluster that communicates with head stations of other clusters. The stations are configured by determining the communication state between a station and one or more cluster head stations. The station is assigned to at least one cluster when a prescribed communication state has been determined between the station and the cluster head station. The station is set to be in independent communication with the one or more cluster head stations which have the prescribed communication state with the station.

28 Claims, 8 Drawing Sheets

OTHER PUBLICATIONS

"Packet Radio Routing," Gregory S. Lauer, Ch. 11, "Routing in Communication Networks," ed. Martha Steenstrup, Prentice Ha 1995.*

"Packet Radio Network Routing Algorithms: A Survey," J.J. Hahn et al., IEEE communications Magazine, vol. 22, No. 11, Nov. 1984, pp. 41–47.*

"Link–State Routing," John Moy, Ch. 5, "Routing in Communications Networks," ed. Martha Steenstrup, Prentice Hall, 1995.

"Packet Radio Routing," Gregory S. Lauer, Ch. 11, "Routing in Communications Networks," ed. Martha Steenstrup, Prenctice Hall, 1995.

"Packet Radio Network Routing Algorithms: A Survey," J.J. Hahn et al., IEEE Communications Magazine, vol. 22, No. 11, Nov. 1984, pp. 41–47.

"The Organization of Computer Resources into a Packet Radio Network," R.E. Kahn, IEEE Trans. On Communications, vol. COM–25, No. 1, Jan. 1977, pp. 169–178.

"Analysis of Routing Strategies for Packet Radio Networks," J.J. Garcia Lune Aceves et al., Proc. Of the IEEE INFOCOM '85, Washington, DC, Mar. 1985, 292–302.

"The DARPA Packet Radio Network Protocols," J. Jubin et al., Proc. Of the IEEE, vol. 75, No. 1, Jan. 1987, pp. 21–32.

* cited by examiner

FORMAT OF A LINK STATE SNAPSHOT

FORMAT OF AN AFFILIATION SNAPSHOT

OVERVIEW OF AN AFFILIATION PROTOCOL

NODE BELONGING TO MULTIPLE CLUSTERS IN AN AD HOC WIRELESS NETWORK

CROSS-REFERENCES TO RELATED APPLICATIONS

This application claims the benefit under 35 U.S.C. 119 based on U.S. Provisional Patent Application No. 60/170,751, filed Dec. 15, 1999, by the same inventors named herein.

STATEMENT REGARDING FEDERALLY SPONSORED RESEARCH OR DEVELOPMENT

This invention was made with Government support under Contract No. DAAB07-96-C-C760, awarded by the U.S. Army. The Government has certain rights in his invention.

BACKGROUND OF THE INVENTION

1. Field of the Invention

The present invention relates to an apparatus and method for network communication, and more particularly to a communications network arranged with clusters of stations, each cluster having a head, with each of the stations affiliating, when possible, with two or more cluster heads.

2. Related Art

Communications networks can be formed by arranging a plurality of mobile communications stations into a hierarchical configuration including groups (or "clusters"), with each group having a group or cluster head (or "cluster gateway"). Many conventional networks confine their configurations by predetermining or preselecting access points, even though the networks may allow a member station to switch affiliation from one access point to another. For example, in some mobile-radio networks, there can be a hand-off of a mobile unit from one base station to another, the hand-off being initiated by the base station. Oftentimes, these types of gateway stations are stationary or immobile, further limiting the flexibility of the network.

An example of a flexible mobile communications network is disclosed in U.S. Pat. No. 5,850,592, issued to S. Ramanathan on Dec. 13, 1998, and assigned to the same assignee. The U.S. Pat. No. 5,850,592 discloses a method for a plurality of mobile stations to automatically organize themselves into a hierarchical network, in which some of the stations operate as message gateways for a cluster of mobile stations.

In the arrangement of the U.S. Pat. No. 5,850,592, a plurality of mobile stations are employed, with each station being able to operate in at least two basic modes. In a first mode, the mobile station serves as a message gateway (e.g., a "cluster head" or "network access point") for a cluster of other member stations (e.g., "non-gateway" stations). The second mode allows the mobile station to operate as a non-gateway (or "cluster member") station. Each mobile station determines which out of the two modes to operate in.

The mobile stations disclosed in the U.S. Pat. No. 5,850,592 are capable of operating at two different power levels. When operating as a cluster head, the mobile station transmits at a relatively high power level. The cluster head transmits at the relatively high power level to communicate with other cluster head stations and to typically provide longer distance network links. Although the cluster head communicates at a higher power level with other cluster heads, the cluster head can still communicate with its cluster members using a relatively lower power level. A cluster head can also periodically broadcast a so-called beacon message to establish the station's presence and its availability to operate as a cluster head. The beacon message may contain address or node-identifying information, affiliation information, and communication protocol information, for example.

Cluster head stations communicate with each other to form a network backbone. Cluster member stations affiliate with only one cluster head at a time. A possible network arrangement is shown in FIG. 8. Each cluster member ($2a'$–$2d'$) includes the ability to affiliate with a cluster head (e.g., $1a'$–$1c'$), and if a cluster head is not available, to commence operation as such.

Each cluster head station also is equipped to identify whether any other cluster heads are within affiliation range, and if so, to initiate a procedure to terminate operation as a cluster head, if such termination will not reduce connectivity of a network backbone excessively. Before terminating operation as a cluster head, the cluster head can broadcast a termination request and wait for a predetermined time to see if the request is accepted by all members. In known systems as exemplified by the U.S. Pat. No. 5,850,592, each cluster member has only a single cluster head, and all communications traffic goes through that cluster head. If the single cluster head is lost unexpectedly, for example in a military operation or in an emergency situation (e.g., a natural disaster), the cluster member is temporarily cut off from the network. As a result, the cluster member must start a cluster affiliation protocol to reestablish a relationship with an available cluster head. If the cluster member cannot establish a link with a cluster head, it will then promote itself to be a cluster head, and seek affiliation with other cluster heads. These steps consume valuable time. During this "down time," the cluster member is temporarily cut off from the network. Severing communications in an emergency or in a military operation can produce catastrophic results.

These types of problems are not adequately addressed in the art. Thus, there is a need for a flexible communications station in a communications network to simultaneously affiliate with multiple clusters, instead of just a single cluster at one time. There is another need to provide an adaptive, wireless mobile communications station with the ability to automatically organize with other similar mobile stations into a network, the stations each being able to gain affiliation with multiple groups.

SUMMARY OF THE INVENTION

The present invention relates generally to a station capable of belonging to multiple clusters in an ad hoc wireless network.

According to the invention, a communications system for communication among plural stations in a network is provided in which stations are arranged in clusters of communication member stations each communicating with each other and one of the member stations is a head station of the cluster. Each cluster head station communicates with other cluster head stations.

According to one aspect of the invention, a method is provided including (i) determining a communication state between a station and one or more cluster head stations; and (ii) assigning the station to the one or more clusters when a prescribed communication state has been determined between the station and the cluster head stations, wherein the station is set to be in independent communication with the one or more cluster head stations having the prescribed communication state with the station.

According to another aspect, the station is assigned to plural clusters when the prescribed communication state with plural cluster head stations has been determined and is in independent communication with each of the plural cluster head stations.

According to still another aspect, the station is set to be in concurrent communication with the plural cluster head stations with which the station has the prescribed communication state.

According to yet another aspect of the present invention, the assignment of the station to each of the plural clusters is preformed asynchronously. Furthermore, the prescribed communication state is based on at least one of an evaluation of a received signal strength from each of the cluster head stations, successful receipt of a predetermined number of messages from each of the cluster head stations, a ranking according to administrative function, and the numbers of stations within a cluster.

According to yet another aspect of the invention, the station is assigned to be a cluster head when the prescribed communication state has not been attained with any of the cluster head stations.

According to yet another aspect of the invention, data messages are sent via one of the cluster head stations of the clusters to which the station is currently assigned. Also, data messages are received through one of the cluster head stations to which the station is currently assigned.

According to yet another aspect of the invention, an assignment of a station to a cluster can be switched, but assignment of the station to at least one cluster is maintained.

According to still another aspect of the invention, a status of the assignment of the station to other stations is periodically relayed. Furthermore, the assignment of the station is maintained with the plural clusters for a randomly selected time.

In one embodiment, the station according to the invention is a mobile station, and the communications network is a mobile communications network.

In another embodiment, a method of operating a communications station for communicating among a plurality of communications stations in a communications network, is provided. Each station is able to receive and transmit signals, the stations being arranged into cluster groups each having at least one station. Each cluster group includes at least one station designated as a cluster head. The method includes (i) recognizing a plurality of cluster heads for potential affiliation with the station; (ii) deciding a subset of the recognized cluster heads for the station to affiliate with; and (iii) allowing the station to concurrently affiliate with at least two cluster heads of the subset.

In still another embodiment, in a mobile communications network employing a plurality of mobile stations, a method of operating a mobile station so as to automatically configure the plurality of stations into a network for relaying messages from station to station is provided. The method includes (i) determining possible network access points to the mobile communications network; (ii) attempting to establish a simultaneous communication affiliation with at least two network access points, and establishing simultaneous communication affiliation with the at least two access points if possible, wherein a communication affiliation with each of the at least two access points is independent from one another; (iii) and allowing the mobile station to change network access points.

Another embodiment relates to a mobile communications station for communicating among a plurality of mobile stations in a network in which stations are arranged in clusters of communication member stations. Each of the member stations communicate with each other and one of the member stations is a head station of the cluster, the cluster head stations communicate with other cluster head stations. The mobile communications station includes a transceiver. The mobile station includes a processor which: (i) determines a communication state between the mobile station and one or more cluster head stations; (ii) assigns the mobile station to the one or more clusters when a prescribed communication state has been determined between the station and the cluster head station; and (iii) sets the station to be in independent communication with the one or more cluster head stations having the prescribed communication state with the station.

Still another embodiment relates to computer executable code stored on a computer readable medium. The code is for operating a communications station so as to communicate with a plurality of mobile stations in a network in which stations are arranged in clusters of communication member stations and one of the member stations is a head station of the cluster. The cluster head stations communicate with other cluster head stations. The computer executable code includes: (i) computer executable code to determine a communication state between a station and one or more cluster head stations; (ii) computer executable code to assign the station to the one or more clusters when a prescribed communication state has been determined between the station and the cluster head station; and (iii) computer executable code to set the station to be in independent communication with the one or more cluster head stations having the prescribed communication state with the station.

Yet another embodiment relates to a network communications apparatus. The apparatus includes a memory, processor, and transmitter. The memory stores network topology information. The processor (i) facilitates communication with multiple communication gateways in the network, and (ii) determines a lowest-cost routing path for message transmission through the network based on the network topology information. The transmitter transmits messages to communication gateways.

Still another embodiment relates to a network communications apparatus. The apparatus includes means for storing, means for facilitating, means for determining, and means for transmitting. The storage means stores network topology information. The facilitating means facilitates communication with multiple communication gateways in a network. The determining means determines a routing path for message transmission through the network based on the network topology information. The transmitting means transmits messages to communication gateways.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Figure 1:
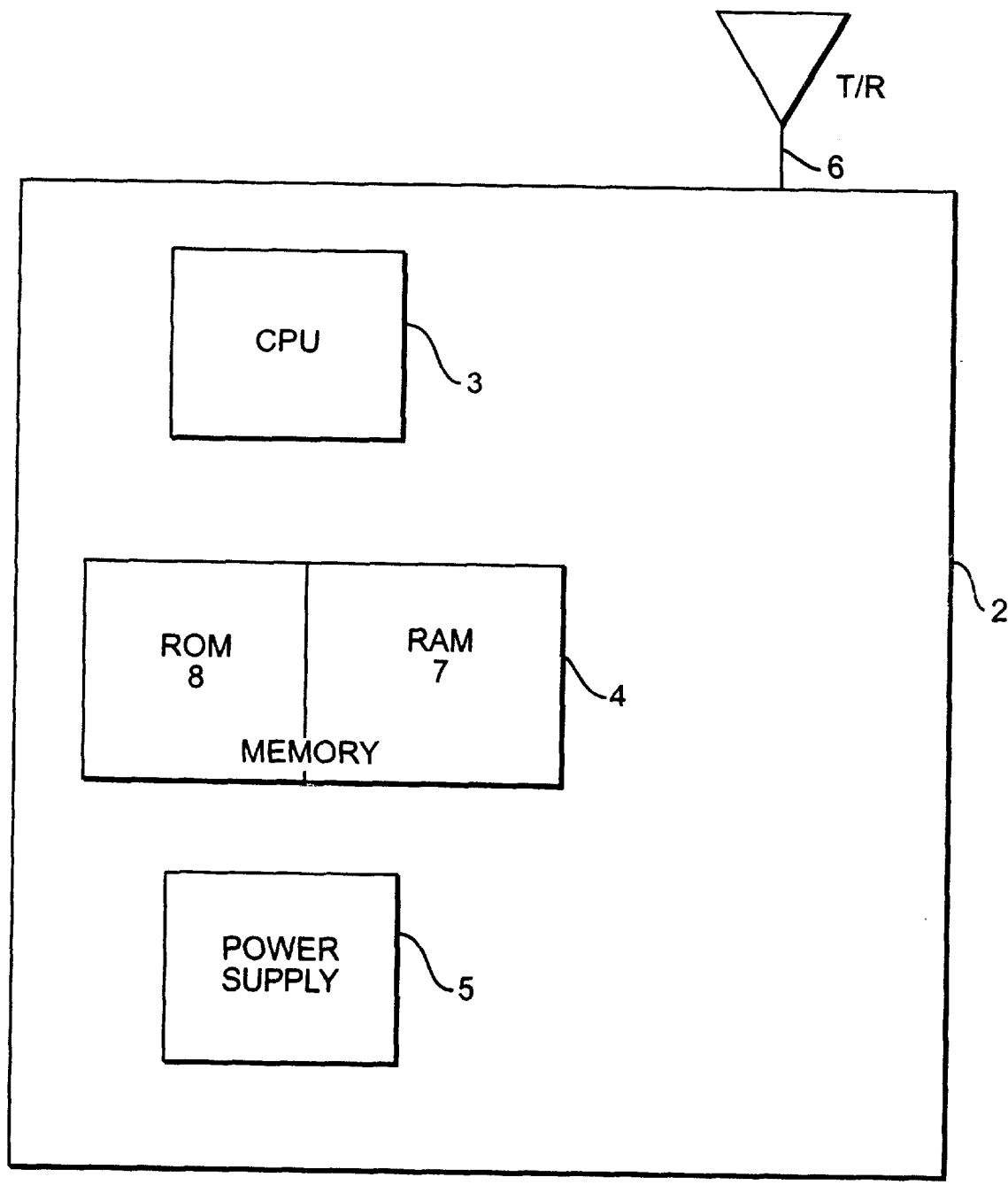
FIG. 1 is a block diagram of a mobile communications station.

Ad hoc wireless networks simplify routing and minimize routing traffic by organizing nodes (e.g., network members) into groups called clusters. A cluster may consist of a single cluster head and zero or more cluster members. It is an object of the present invention to allow one or more wireless cluster members in a network to concurrently belong to or affiliate with multiple clusters instead of just affiliating with a single cluster at a time. This multiple-cluster membership can either be transitional, to better enable a smooth transition between clusters, or longer-term to provide more reliable or lower-delay communication between a mobile member and a mobile network.

With multiple-cluster membership, cluster members can search and find available cluster heads to affiliate with. To establish an affiliation link with a cluster head, a cluster member can send an affiliation request to that cluster head, and wait for an acceptance response back from the cluster head; for example. If the acceptance response returns within a predetermined time, or is received with a sufficient signal strength, for example, a link will be formed. Optionally, at this time the cluster member and cluster head can exchange identifying information or specific transmission protocols, to enhance transmission.

If a cluster head is unavailable, the cluster member can promote itself to be a cluster head (or "cluster gateway"). In the present invention, a cluster member keeps track of a number of nearby or available cluster heads. Each cluster member can form a "beacon" database to help track cluster heads within transmission range. The beacon database can include fields such as cluster head ID, organization matches, beacon strength (or a metric qualifying the received beacon), a metric synthesizing all other beacon fields into a measure of how "good" a cluster would be to join, etc. The cluster member determines which out of the available cluster heads to affiliate with (e.g., forms a subset out of the available cluster heads) based on a number of different factors. For example, a subset is formed based on a received signal strength from the cluster heads, by successful receipt of "l" of "m" beacons from the cluster heads, by favoring affiliations with a cluster head belonging to a certain administrative group, by favoring a cluster head with fewer cluster members, and so forth.

The present invention allows a cluster member to simultaneously affiliate or cluster with more than one cluster group. In this regard, affiliation and deaffiliation between a cluster member and one or more cluster heads may be fully asynchronous. That is, an affiliation process between a cluster member and a particular cluster head "X" is independent of the same cluster member and another cluster head "Y." The particular affiliation can be performed at any time, and the affiliations need not be performed with the same timing or in any particular order.

As discussed in detail below, a cluster member can forward data, or communicate through, any of its currently affiliated cluster heads. The cluster member can also determine the optimum path for delivering a particular message.

Similarly, other cluster members in the network can transmit data to a given cluster member through any affiliated cluster head, but preferably the cluster members choose to send the message via an optimum route. Multiple-cluster membership gives the network additional options in which to optimize traffic loads in its routing strategies.

To help optimize network routing, a cluster member generates and issues its own link-state type update or an "affiliation snapshot." For example, the affiliation snapshot can include a list of cluster heads affiliated with the cluster member. The snapshot can also include a metric associated with each cluster head to indicate the relative cost or desirability of communicating with the cluster member through each of the affiliated cluster heads. Typically, the affiliation snapshots are sequentially numbered, so that the newest such snapshot from a given node can be uniquely determined. Alternatively, the basic network routing can be based on distance vector techniques with suitable modifications to the affiliation snapshot. The cluster head redistributes or "floods" the snapshot to the network. Various flooding techniques are well known, for example, those discussed in Chapter 5 of "Routing in Communications Networks," M. Steenstrup, ed., 1995.

There are many advantages of the arrangements discussed above. For example, multiple-cluster membership allows for a smooth transition as a cluster member transitions from one cluster head to another. During the transition time, the cluster member preferably maintains membership with its old cluster group as well as its new ones. In this manner, the cluster member can receive messages via its old address, as well as its new addresses. The above-discussed arrangements also allow for a fast-moving cluster member to belong to a "swath" of clusters rather than a single cluster, thereby improving the chance that the cluster member will be able to receive a message (since it may transition through a cluster too fast for various routing algorithms to converge on the newest cluster in time).

Another advantage of the present invention is that a cluster member with poor connectivity with one or more cluster heads improves its chances of message reception since it is simultaneously affiliated with a number of cluster heads. Such aggregate connectivity may provide a better message throughput than affiliation with a single cluster head. Also, as discussed above, the present invention increases the survivability of the network, since the destruction of a single cluster head will not force reaffiliation of all of its cluster members before they can rejoin the network (if the cluster members are affiliated with multiple cluster heads). Furthermore, the present invention can allow superior efficiency in delivering packets to or from the cluster member, since a path between the cluster member and an arbitrary other cluster member may have a lower overall cost (e.g., path metric) via the cluster head "X" than one via the cluster head "Y."

As understood by those skilled in the art, various procedures exist for routing messages over a network, even when the configuration of the network may change. Similarly, there are procedures for measuring or rating the connectivity of a network in a particular configuration, versus alternative configurations that are well known in the art.

The preferred embodiments will be described with respect to a wireless mobile communications station and to a network formed by a plurality of similar mobile stations. However, the present invention is not limited to the wireless mobile communications field. Instead, the invention is applicable to many other types of networks, including cellular telephone systems, wireless metropolitan area networks, and so forth.

A wireless mobile communications station 2 is shown in FIG. 1. The mobile station 2 includes a central processing unit (CPU) 3, a memory 4 (suitable for storing computer executable software therein), a power supply 5, a transceiver 6 (e.g., a transmitter and a receiver), RAM 7 and ROM 8. Alternatively, the mobile station 2 may include more than one transmitter and/or more than one receiver. The mobile station 2 can also include an Ethernet interface, as well as other interfacing ports. With these arrangements, the mobile station 2 is able to simultaneously communicate with more than one station. Communication with multiple stations can occur, for example, through different channels (or "communications links"), and/or by transmitting specific identifying information (or "coded information") for each intended source or target. One definition of a channel is a means to communicate so at least two transmissions can proceed simultaneously without interfering with each other.

Figure 7:
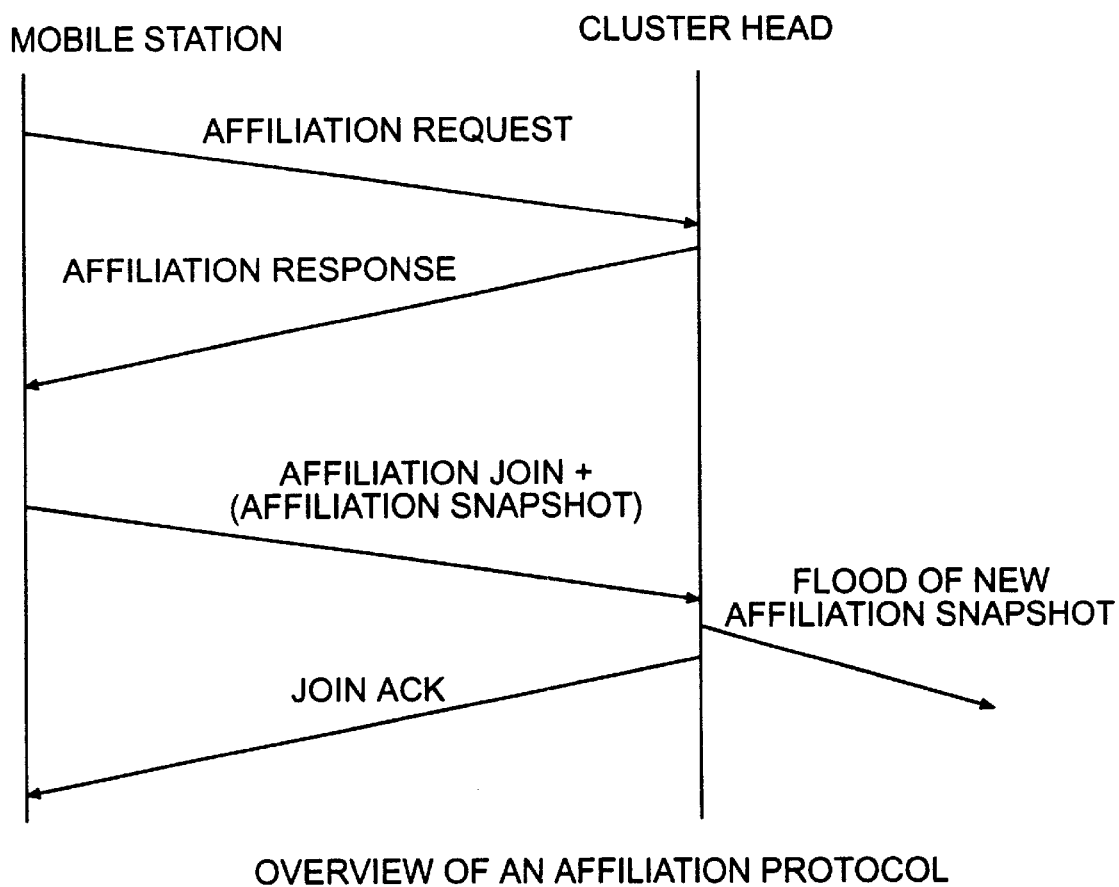
FIG. 7 is a diagram showing an overview of an affiliation protocol.
Figure 8:
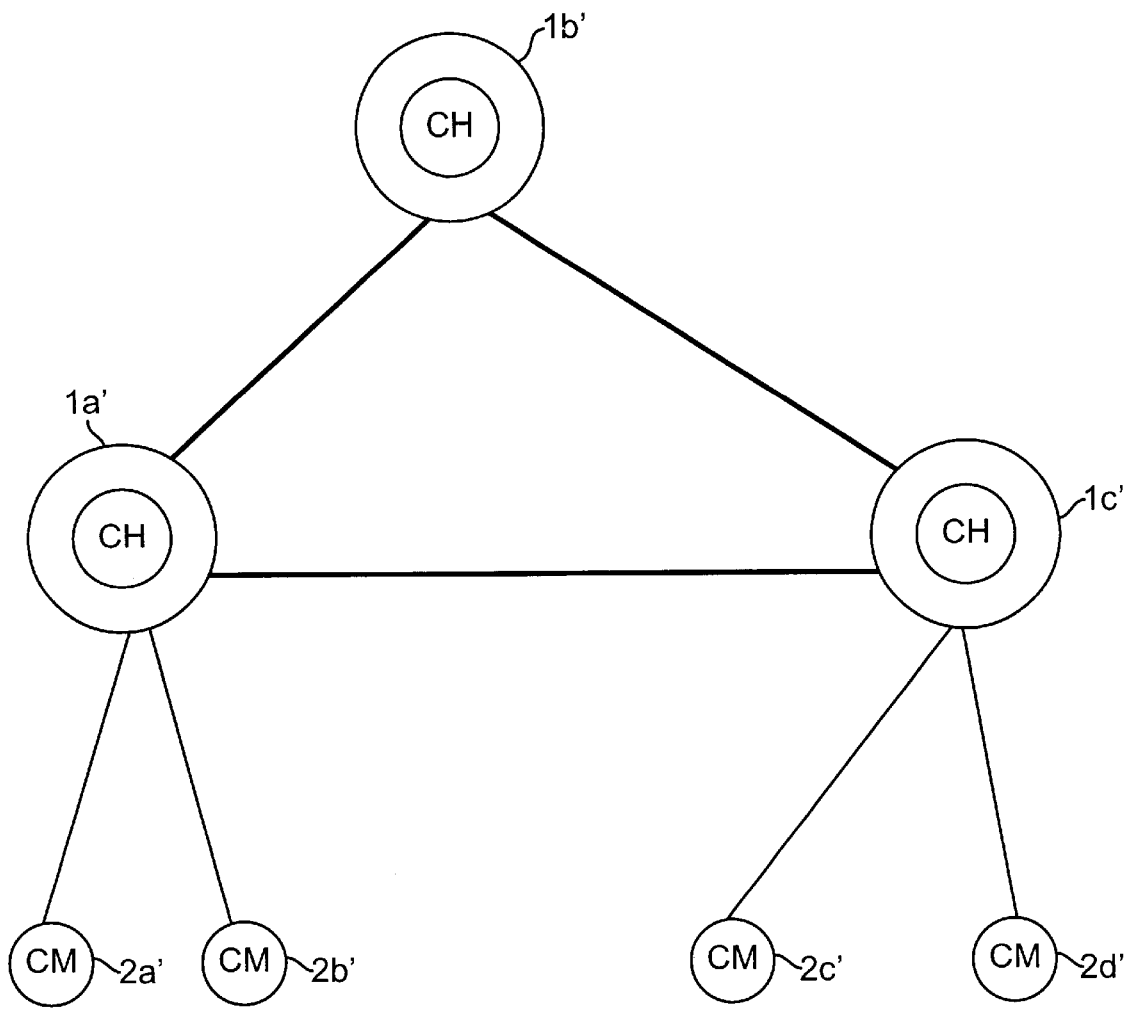
FIG. 8 is a diagram illustrating a network configuration showing a single-cluster membership.

The mobile network can designate one channel (e.g., a "reservation channel") as an affiliation channel. Mobile stations can use the reservation channel when sending affiliation signals to other mobile stations. The reservation channel can also be used by cluster heads when issuing periodic beacon messages. A mobile station preferably gains membership to a cluster group after successfully completing a "handshaking" protocol with the group's cluster head. An example of an affiliation protocol is shown in FIG. 7. A mobile station issues an affiliation "request" message on the reservation channel, until it receives an affiliation "response" message from any available cluster head. The initial affiliation request signal can include address (or "node ID") information, an affiliation request, a member affiliation sequence number, organizational information, and the like.

A replying cluster head also communicates via the reservation channel. The reply message can include the cluster head's ID, a response to the affiliation request, the member's affiliation sequence number (to identify the communication), and other communication protocol information, like a designation of a channel (a "local channel") for further communications. Repeating the exact affiliation sequence number enables the cluster member to differentiate communications with different cluster heads, for example.

Upon receipt of the affiliation response message, the cluster member issues an affiliation "join" message. The affiliation join message also can include an affiliation snapshot, which once received is flooded through the network by the cluster head. A successful handshake is completed when the cluster head issues, and the cluster member receives, a return join acknowledge message.

The local channel is used for communications between cluster heads and cluster members, for example. A "backbone" channel also can be used in the network for communications between cluster heads. Each of the local and backbone channels can have more than one subchannel (e.g., different frequencies). As will be appreciated, a mobile station can concurrently communicate with multiple cluster heads through different subchannels on the local channel. Similarly, a cluster head can concurrently communicate with multiple cluster heads through different subchannels on the backbone channel.

Using the communication techniques discussed above, a mobile station 2 operates so as to automatically seek out other mobile stations to form a network, or to join a pre-existing network. The mobile station 2 preferably operates in at least two modes. In the first mode of operation, the mobile station 2 serves as a cluster head (e.g., a network "access point" or "gateway") for other mobile stations. In this capacity, the cluster head is an intermediary between affiliated mobile stations and the network. In the second mode of operation, the mobile station 2 serves as a non-cluster head (e.g., a "local cluster member"). The mobile station can alter its transmission power level for operation in the first or second mode.

Figure 2:
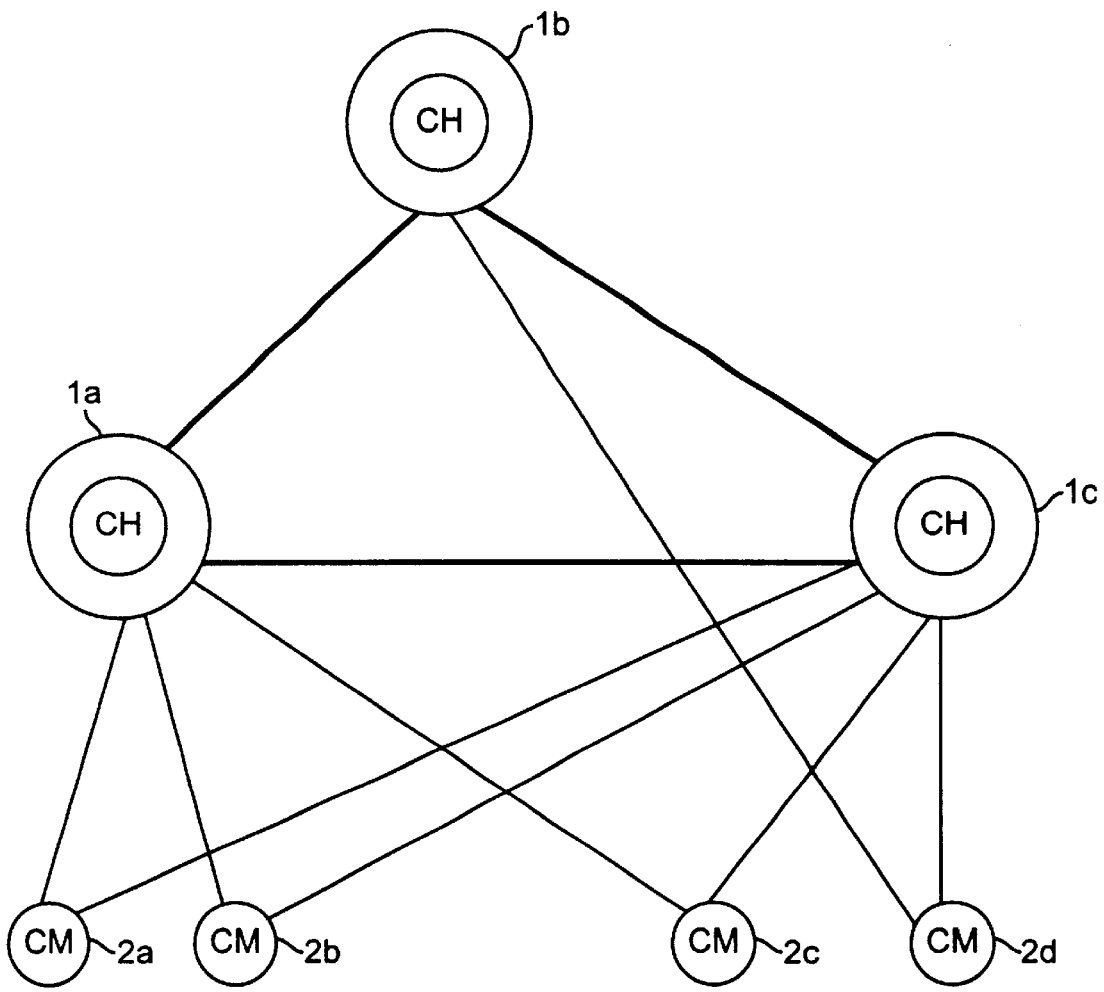
FIG. 2 is a diagram illustrating a network configuration having a multiple-cluster membership.

As shown in FIG. 2, a plurality of mobile stations (1a–1c and 2a–2d) link to form a wireless communications network. Reference numbers 1a, 1b, and 1c are mobile stations that have promoted themselves to operate as cluster heads. Mobile stations 2a–2d are cluster members that have multiple-cluster membership. For example, mobile stations 2a, 2b and 2c each belong to both a cluster group headed by cluster head 1a, and a cluster group headed by cluster head 1c. Cluster member 2d belongs to the cluster groups headed by cluster heads 1b and 1c.

An operation of the mobile station 2 will now be described with reference to the flowcharts shown in FIGS. 3–5. The mobile station 2 is powered up or turned on in step S0. After a random amount of time (S1), operation proceeds to step S2, where an asynchronous affiliation procedure is executed. The asynchronous affiliation procedure is described later on with reference to FIG. 4.

A determination is made as to whether an affiliation with a (S3) cluster head, or with several cluster heads, is successful. If successful, flow continues to step S8 where the mobile station commences operation as a cluster member. If, however, affiliation is unsuccessful, the cluster member promotes itself to operate as a cluster head (S4). Many alternative arrangements are available for determining when to promote the cluster member to a cluster head. In one arrangement, promotion to a cluster head occurs when affiliation with all available cluster heads has failed, for example, after a predetermined number of attempts to affiliate. In another arrangement, promotion occurs after a lapse of a predetermined time and the mobile station has failed to gain affiliation with at least one cluster head. In still another arrangement, a minimum number of desired affiliation links is determined. For example, the minimum number could be set to be two, with every cluster member in the network attempting to affiliate with at least two cluster heads. If a mobile station fails to affiliate with two cluster heads an "unsuccessful" attempt is returned.

The asynchronous affiliation procedure (S2) is further explained with reference to FIG. 4. Initially, the mobile station waits for a predetermined amount of time (e.g., "T" seconds) and gathers information regarding available cluster heads (S20). In the gathering process, the mobile station receives messages (or beacon signals) from available cluster heads (e.g., cluster gateway stations or "CGSs"). Information gathered and stored in the beacon database can include the strength of a received signal, the number of successful beacons received from a cluster head (e.g., receipt of "l" of "m" beacons), a number of cluster members already affiliated with a cluster head, or the type of administrative function of a cluster head or group. Whereas step S20 is shown as a single step in FIG. 4, the mobile station 2 could be configured to continuously gather information regarding available cluster heads, or to periodically update existing information, for example. In collecting information, the mobile station preferably disregards a gateway station with a beacon signal strength of less than a threshold value (S21). Making such an initial discrimination based on signal strength helps to ensure viable communications links throughout the network.

In step S22, the available number (e.g., "N") of cluster gateway stations are organized into an ordered list, or are ranked in order of the most preferable cluster gateway stations. The ranking may include grouping the cluster heads on the list into subsets of "K" cluster heads, based on many different factors. As previously discussed, a subset can be created from information gathered from the cluster heads' messaging beacons. A subset may include a cluster head (or heads) that has the strongest transmitting signal or the fewest affiliated members. Alternatively, a subset may be based on any other information that is gathered from the cluster heads, or based on criteria from the mobile station itself. As illustrated, each communications link is established from an exclusive portion of the list (e.g., a subset of K-of-N cluster heads). For example, the mobile station first could attempt to establish communications links from a subset including cluster heads with the fewest cluster members, and communications links from a second subset including preferred administrative function. Alternatively, the first communications links could be established from a subset including cluster heads with the strongest beacons, and the second links from a subset that includes cluster heads with the second strongest beacons. Alternatively, the ordered list can be formed on a random basis or on a first-come, first-served basis, for example.

The mobile station determines whether at least one cluster head in the list is marked "not done" (S23). A "not done" marking indicates that a cluster gateway station (CGS) is available, and/or not already currently linked with the mobile station. If there are no available cluster heads, the mobile station 2 returns and "unsuccessful" signal (S24) to the operational control in step S3 of FIG. 3.

If at least one item in the list is marked "not done," the mobile station 2 sends an affiliation request signal (S25) to each of a "K" number of the "N" number of available cluster heads in the ordered list. As discussed, the "K" number can be a predetermined number or can represent a particular subset of the available cluster heads. If a predetermined time has not elapsed (S26), the mobile station checks to see if it has received an affiliation response (S27) from any of the K-of-N cluster gateway stations. Upon receipt of an affiliation response, the mobile station sends an affiliation "join" signal (and optionally, an affiliation snapshot) to the responding cluster head (S28). The cluster head is marked "done" to indicate that it is affiliated with the mobile station. As an alternative arrangement, the cluster head is marked "done" when the mobile station receives a "join" acknowledgment back from the cluster head. In this manner a "handshaking" procedure is carried out in steps S25–S28, and multiple communications links with separate cluster heads can be established independently from each another. Hence, affiliation with different cluster heads occurs asynchronously or in parallel.

When a predetermined time elapses, the mobile station 2 evaluates whether a minimum desired number of cluster heads has been marked "done" in the K-of-N sub-list (S29). If affiliation with a minimum number of cluster heads has been reached, the mobile station returns a "successful" signal (S30) to step 3 of FIG. 3. Preferably, the mobile station will affiliate with at least two cluster station gateways. If the minimum number has not been reached, all items in the K-of-N list are marked as "done" (S31) and flow returns to step S22. Returning to FIG. 3, once a mobile station affiliates with a cluster group through a particular link (S8), it periodically checks (S9 and S10) the affiliation status of that link. If the link is disrupted, flow continues to S1. If affiliation is maintained (back to S9), the mobile station may transmit to the network a fresh affiliation snapshot, as described below. As will be appreciated, the cluster member could transmit an affiliation snapshot at any time, and therefore, transmitting a snapshot need not occur in the "Execute Affiliation Check" step.

The mobile station also can change affiliation if, for example, the mobile station is rapidly moving, the subset criteria have changed based on function or communications need, or if the quality of the communications link has been compromised. Various resignation procedures are employed for a resigning cluster member. For example, a resigning cluster member can send a "resignation" signal to the affected cluster head. Upon receipt of the signal, the cluster head can update its link-state snapshot and database, as discussed below. Alternatively, the cluster member can simply cease operation with the affected cluster head. In this case, the network is notified of the change by the cluster member's next affiliation snapshot, as described below, or by the cluster head realizing that communication with the particular cluster member has ceased. Preferably, a continuous network link is preserved by maintaining at least one link at all times.

Step 11 is an optional step for verifying whether the mobile station maintains communication with at least one cluster head at all times. If all communication is terminated, operational control of the cluster member returns to step S1. As will be appreciated, the operation discussed in FIGS. 3 and 4 can concurrently direct or manage communication with each cluster group that a mobile station is affiliated with.

Once a mobile station is promoted to be a cluster gateway station, it can periodically check (S5) proximity conditions to other cluster gateway stations. If the check indicates that the proximity conditions are exceeded, i.e., that the particular cluster head station's operation as a gateway is possibly redundant and/or unnecessary, the station executes a resignation procedure (S6). Otherwise, the cluster head continues operation as a gateway station. The resignation procedure determines if affiliated members (and/or affiliated cluster heads) will allow the cluster head to resign. If the cluster head can resign, flow continues to step S1. Otherwise, the station continues operation as a gateway station.

As previously discussed, each mobile station can select the optimum route to transmit messages throughout the network. In this regard, the mobile station preferably can receive messages via any affiliated node. In one arrangement, mobile stations are assisted by an affiliation snapshot of each cluster member so that routing through the network can be optimized.

Network topology is defined by a series of "snapshots" which are issued from each mobile station in the network. These snapshots are routed or flooded through the network by the cluster heads. Preferably, there are two types of snapshots: link-state and affiliation. Link-state snapshots are issued by a cluster head, for example, when: i) its set of backbone links change; ii) its metrics to one of its backbone links or cluster member changes; and iii) periodically to ensure that old, aged-out snapshots are replaced by new, fresh snapshots.

Figure 6A:
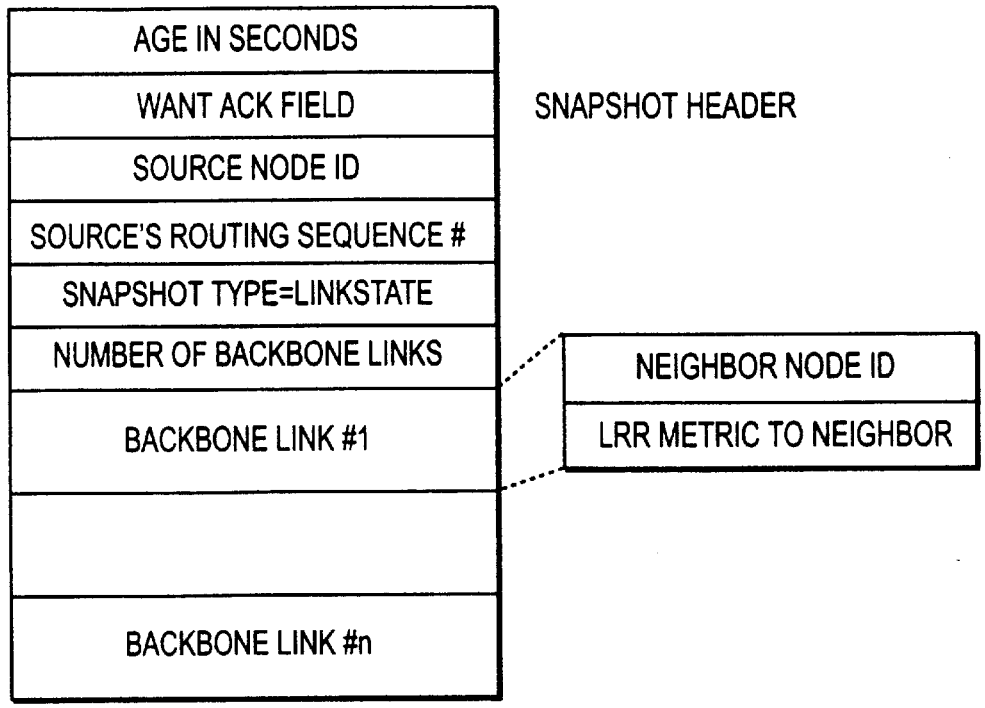
FIGS. 6A and 6B are diagrams illustrating examples of link-state and affiliation snapshots.

FIG. 6A is a diagram showing an illustrative link-state snapshot. Possible fields include Age in Seconds, WantAck, Source Node ID, Source's Snapshot Sequence Number, Snapshot Type, Number of Backbone Links, and Backbone Link entry. The Age in Seconds field gives the estimated age of the snapshot in seconds. This estimated age is used primarily for aging snapshots out of a database when they become "too old" to be trusted. "Too old" can be determined by many factors, including a comparison against a predetermined time, or a comparison to a frequency of updates for other snapshots, for example. The WantAck field is a request for an acknowledgment of receipt of the snapshot from other cluster heads. Receiving acknowledgments can assist the issuing cluster head with its various network flooding techniques, and to evaluate transmission time, and the like. The Source ID is a unique identifier or node-address for the issuing cluster head.

The Source's Snapshot Sequence Number is a unique sequence number that identifies the position of the snapshot within the stream of snapshots emanating for the issuing cluster head. This sequence number is used to determine whether one snapshot is newer than another. A cluster head may receive several copies of the same snapshot from several different neighboring cluster heads. In this case, the sequence number identifies that the repetitive snapshot is the same update. Furthermore, it is possible that a snapshot could get delayed by network congestion and arrive at a cluster head later than a newer snapshot. The sequence number enables a cluster head to ignore stale snapshots.

The Snapshot Type field distinguishes between link-state snapshots and affiliation snapshots. This field is set to indicate a link-state snapshot when it is issued from the cluster head. As its name suggests, the Number of Backbone Links field indicates how many backbone links are in service from the issuing node to its cluster head neighbors. This field identifies the number of Backbone Link entries contained within the snapshot. Each Backbone Link field conveys information about one of the in-service links from the issuing cluster head to an affiliated (or connected) cluster head. The field preferably contains the affiliated cluster head's node or address ID and the most up-to-date metric (as discussed below) from the issuing cluster head to the affiliated cluster head.

Figure 6B:
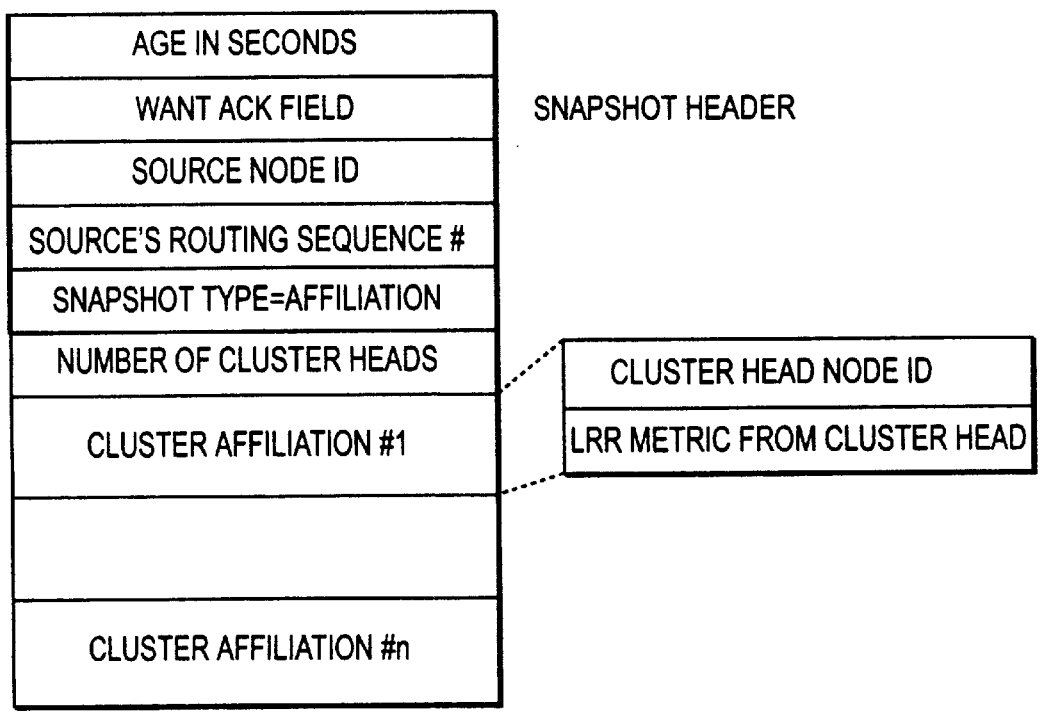

An affiliation snapshot, as shown in FIG. 6B, is issued by a cluster member. A cluster member can issue the affiliation snapshot when it changes its cluster affiliation (e.g., moves from one cluster to another, or affiliates with additional clusters) and periodically to ensure that old, aged-out snapshots are replaced by new, fresh ones. Possible fields include Age in Seconds, WantAck, Source Node ID, Source's Routing Sequence Number, Snapshot Type, Number of Cluster Heads and Cluster Affiliations.

The Age in Seconds, WantAck, Source Node ID, and Source's Snapshot Sequences Number are similar to those described above with respect to the link-state snapshot. The Snapshot Type field is set to indicate an Affiliation Snapshot emanating from a cluster member.

The Number of Cluster Heads field indicates how many clusters the issuing cluster member is currently affiliated with and identifies the number of Cluster Affiliation entries contained within the snapshot. Each Cluster Affiliation entry conveys information about one of the clusters to which the issuing cluster member belongs. Preferably, each entry includes the cluster head's node ID and the most up-to-date metric from that cluster head to the issuing cluster member.

A snapshot database can be maintained either by each node in a network, or by only the cluster heads in the network. The database includes both link-state and affiliation snapshots. In this manner, a complete network topology is available to each node in the network.

A metric is an expression or measure of how "expensive" it is to transmit across one link. Typically, a metric is calculated at the transmitting side of the link. For example, if a link exists between nodes A and B, the metric for a link from A to B is the sum of the cost of being processed at node A and the cost of being transmitted from node A to node B. Other factors for determining a metric for a link may include queuing delays at a node, congestion through a node, and statistical delay probabilities caused by interference or disruption of a signal, and so forth.

As discussed, each mobile station can select the optimum route (e.g., a route with the "lowest cost") to transmit messages throughout the network. To facilitate selection, in one embodiment, a forwarding table is created to express the cost of forwarding messages. Since each mobile station has a snapshot database, a shortest path tree with itself as the root and all other nodes (via affiliated cluster heads) as branches is created. The "length" of each link is given by the metric for that link, and a path metric is the sum of the lengths along that path. Once the tree is constructed, it is possible to generate a forwarding table that optimally indicates which "next-hop" node or which overall path having the lowest cost should be used for any giving destination node. This calculation can be performed via a shortest-path first algorithm, for example, Dijkstra's algorithm as explained in chapter 5 of "Routing in Communications Networks," M. Steenstrup, ed., 1995. In this manner, each mobile station can determine a transmission path through any of its affiliated cluster heads to optimally send messages through the network.

In another routing arrangement, the mobile station maintains an ordered list of its cluster gateways, and always attempts to use a first cluster head on the list for all packet transmissions. The first cluster head forwards packets using the shortest path first methods discussed above, or simply routes packets of information to a preferred affiliated cluster head, for example. If the cluster member is unable to transmit through the first cluster head, it attempts to transmit via the second cluster head on the list, and so forth.

Figure 5:
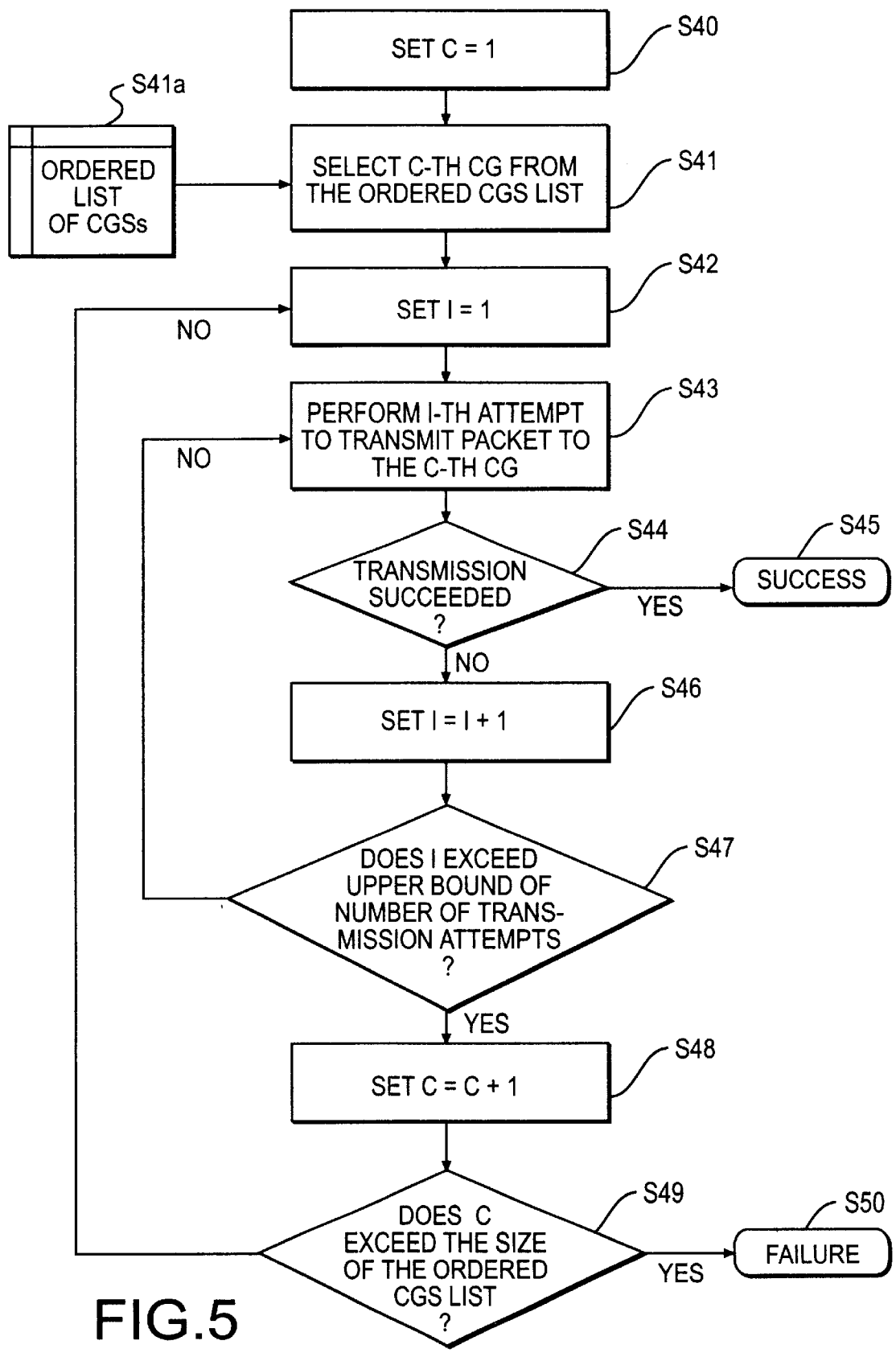
FIG. 5 is a flowchart illustrating a routing operation of a mobile station.

This procedure is illustrated in FIG. 5. Initially, a cluster member chooses the first cluster member (S40 and S41) from the ordered list (S41a) of cluster gateway stations (CSGs) and initializes a "cluster head" counter (e.g., C=1). A "transmission attempt" counter I is initialized in step S42. On the initial routing attempt, the mobile station 2 performs a first attempt (e.g., I=1) to transmit information (S43) to the first cluster head (e.g., C=1). The mobile station evaluates whether the transmission was successful in step S44. Many methods are available for determining whether a packet was successfully delivered. For example, the target cluster head can transmit a received acknowledgment back to the transmitting cluster member. If successful, the mobile station considers the transmission operation complete for that particular packet of information.

If the transmission is unsuccessful, the transmission attempt counter (I) is incremented (S46) and the mobile station evaluates whether I exceeds an upper boundary for a number of transmission attempts (S47). The upper boundary of transmission attempts can be predetermined or can be selected based on factors like node congestion, urgency of the transmission, and so forth. If the upper boundary is not exceeded, flow continues back to step S43 for another transmission attempt. If the upper boundary is exceeded, the cluster gateway counter (i.e., "C") is incremented (S48). Incrementing the cluster gateway counter selects the next cluster gateway from the ordered list of CGSs for transmission.

The mobile station checks whether the size of the cluster gateway counter ("C") exceeds the size of the ordered CGS list (S49). If C does not exceed the size of the list, flow continues to step S42, where a transmission attempt with another cluster gateway station is initiated. If the C counter exceeds the size of the ordered list, the mobile station recognizes a transmission failure (S50).

In still another routing arrangement, a cluster gateway may advertise its own cluster members via listing their node identifiers in the cluster beacon. Since a mobile station 2 will receive these lists—as it receives the beacons from various cluster heads—it can determine which nodes are readily reachable via the broadcasting cluster heads. When a cluster member wishes to transmit a packet to some destination "D," it can inspect these lists to determine which (if any) cluster gateways have D as a member of the cluster. The packet can be forwarded with the appropriate routing information. A mobile station may not always have a complete list of every cluster member in a network. Nevertheless, the information contained in the beacons may allow a cluster member to select an appropriate route for the messages.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the mobile station generally has been described with two communications links. However, the mobile station can include any number of links. Also, as will be appreciated by those skilled in the art, the methods and control logic, as described herein, can be embodied in a programmable computer or in computer executable software that is stored on a computer readable media, for example, on a floppy disk, RAM, ROM, a hard disk, removable medium, flash memory, memory sticks, optical mediums, magneto-optical mediums, etc.

Whereas FIG. 2 illustrates an example of a possible network configuration, it should not be construed as limiting the present invention. Other examples may include a different number of cluster heads and/or affiliated cluster members. Also, FIG. 2 shows that each cluster member is affiliated with two cluster heads. The present invention preferably would have each cluster member affiliate with more than one cluster head, but such multiple-cluster membership for each mobile station in a network may not always be possible. Similarly, individual cluster members may affiliate with more than two cluster heads.

As previously discussed, the described methods, structure and functions are directed to wireless mobile communications stations that automatically configure themselves into a mobile communications network, with each mobile station directing its respective affiliation. However, control could be centralized to the cluster heads, for example, which would then direct affiliation on a network level to optimize the network. Furthermore, the above methods and structure are not limited to wireless communications networks, but may be employed by any system where a node can affiliate with multiple "base stations" in the network simultaneously, rather than being forced to select a given "base station."

Figure 3:
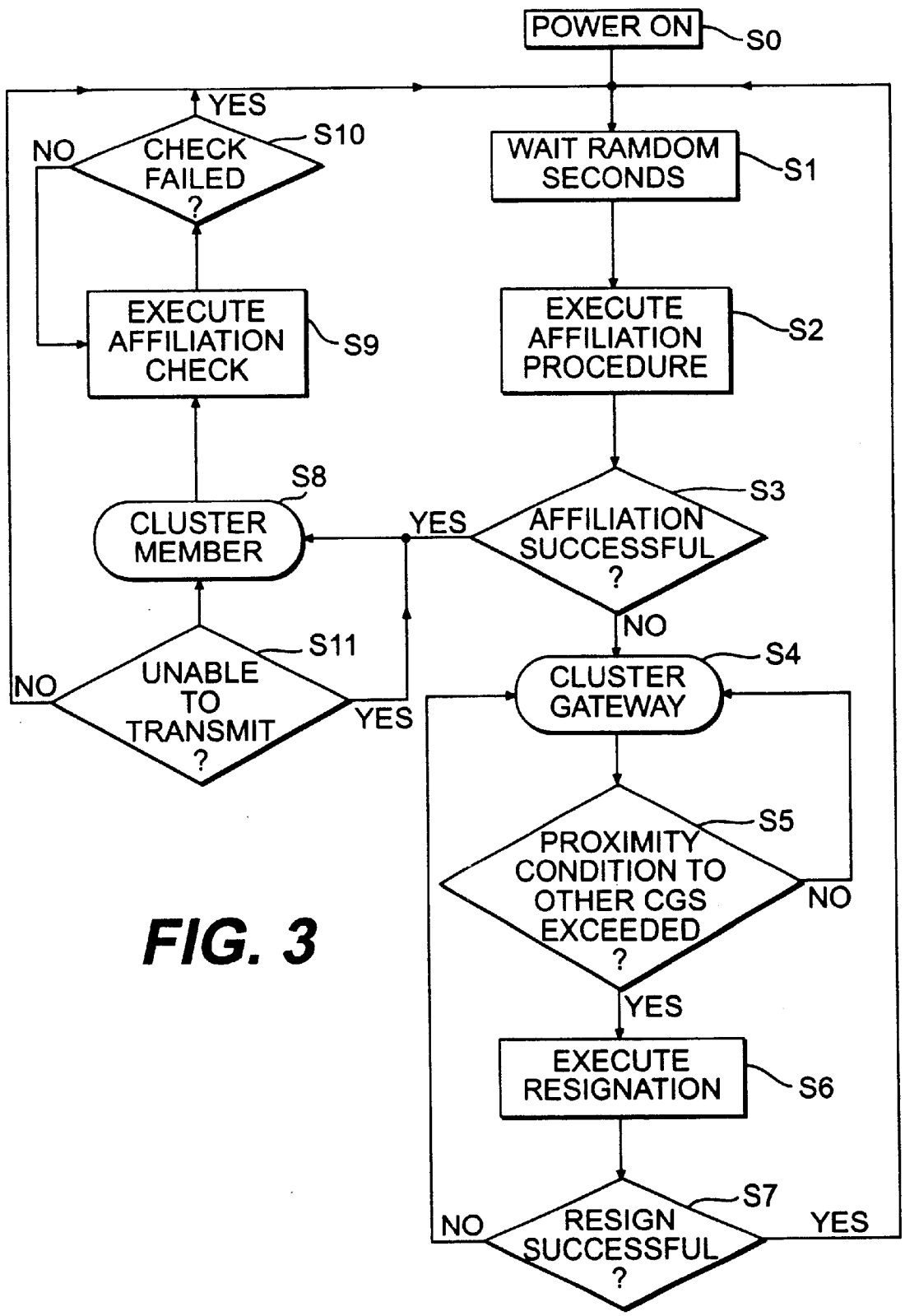
FIG. 3 is flowchart illustrating an operation of the mobile communications station.
Figure 4:
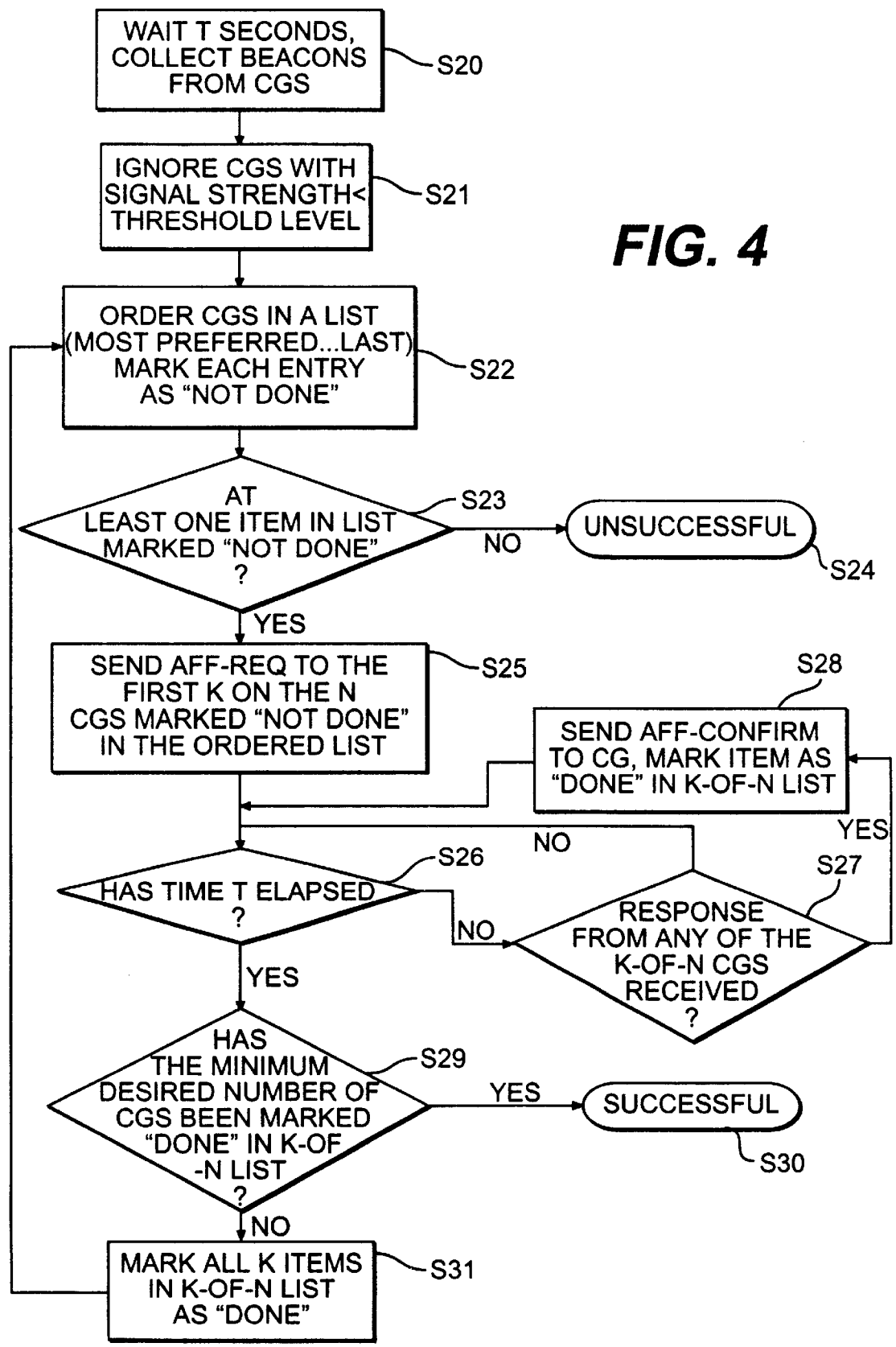
FIG. 4 is a flowchart illustrating an asynchronous affiliation procedure of FIG. 3.

As an alternative arrangement to FIGS. 3 and 4, a mobile station can be configured to first establish a communications link with a first cluster head, before attempting to establish communication with subsequent cluster heads. By using separate communications subchannels, multiple communication links can be concurrently maintained.

As a further alternative, the mobile station can conduct concurrent "handshaking" with multiple cluster heads. Once a cluster head responds to an initial affiliation request, the mobile station can transmit a second (e.g., a "different") affiliation request signal, even before completing a full handshake with the first cluster head. As mentioned, each affiliation request signal is identified by a unique member affiliation request signal number. In this way, mobile stations can properly handle and disregard affiliation or join signals that are intended for other stations. The mobile station could also issue a first request signal and concurrently affiliate with each cluster head that responds to the initial request. Also, whereas a four-step handshake is illustrated, other handshaking techniques can be employed in the invention.

As will be appreciated, cluster heads could be configured to transmit beacon messages on the backbone and local channels, as well as the reservation channel, to increase exposure to the network. Likewise, handshaking could occur on other channels, if the mobile stations are so configured. Similarly, cluster members could be configured to issue periodic cluster member beacons. Cluster member beacons could be used to heal partitioned networks, for example, in much the same way as establishing an initial contact with a cluster head.

Similarly, it is possible for a mobile network to operate, and for a mobile station to still forward messages to other stations, even if the mobile station only has partial network topology information. In this case, a station would choose the optimum route based on the partial information available at that time. As will be appreciated, enhanced optimization can occur if each node has a complete topology map of the network.

What is claimed:

1. A mobile communications station for communicating among a plurality of mobile stations in a network in which stations are arranged in clusters having cluster head stations that communicate with other cluster head station, said mobile station including a transceiver, and comprising:

a processor which: (i) determines a communication state between said mobile station and the cluster head stations of plural clusters; (ii) assigns said mobile station to each of the plural clusters as to which a prescribed communication state has been determined between said mobile station and a corresponding cluster head station; (iii) and sets said mobile station to be in independent communication with each of the plural cluster head stations having the prescribed communication state with said mobile station, wherein all communications between said mobile station and other mobile stations in the network that are not assigned to any of the clusters to which said mobile station is assigned are via at least a cluster head station of a cluster to which said mobile station is assigned and a cluster head station of a cluster to which the other mobile station is assigned.

2. In a communications system for communication among plural stations in a network in which stations are arranged in clusters having cluster head stations that communicate with other cluster head stations, a method for configuring the network of stations including the steps of:

determining a communication state between a station and the cluster head stations of plural clusters;

assigning said station to each of the plural clusters as to which a prescribed communication state has been determined between said station and a corresponding cluster head station; and setting said station to be in independent communication with each of the plural cluster head stations having the prescribed communication state with said station, wherein all communications between said station and other stations in the network that are not assigned to any of the clusters to which said station is assigned are via at least a cluster head station of a cluster to which said station is assigned and a cluster head station of a cluster to which the other station is assigned.

3. The method according to claim 2, wherein said station is assigned to plural clusters when the prescribed communication state with plural cluster head stations has been determined and is in independent communication with each of the plural cluster head stations.

4. The method according to claims 3, wherein in said station is set to be in concurrent communication with the plural cluster head stations with which said station has the prescribed communication state.

5. The method according to claim 4, wherein the assignment of said station to each of the plural clusters is preformed asynchronously.

6. The method of claim 3, further comprising the step of sending data messages via one of the cluster head stations of the clusters to which said station is currently assigned.

7. The method according to claim 3, further comprising the step of receiving data messages through one of the cluster head stations to which said station is currently assigned.

8. The method according to claims 3, further comprising the step of revoking an assignment of a station to a cluster.

9. The method of claim 8, wherein the assignment of the station to at least one cluster is maintained.

10. The method according to claims 3, wherein the assignment of said station is maintained with the plural clusters for a randomly selected time.

11. The method of claim 2, wherein the prescribed communication state is based on at least one of an evaluation of a received signal strength from each of the cluster head stations, successful receipt of a predetermined number of messages from each of the cluster head stations, a ranking according to administrative function, and the numbers of stations within a cluster.

12. The method of claim 2, further comprising the step of assigning said station to be a cluster head station when the prescribed communication state has not been attained with any of the cluster head stations.

13. The method according to claim 3, further comprising the step of periodically relaying a status of the assignment of said station to other stations.

14. The method according to claim 2, wherein each of the communications stations is a mobile station, and the communications network is a mobile communications network.

15. A method of operating a communications station for communicating among a plurality of communications stations in a communications network, each station being able to receive and transmit signals, the stations being arranged into cluster groups each having at least one station, each cluster group including at least one station designated as a cluster head, said method comprising the steps of:

recognizing a plurality of cluster heads for potential affiliation with said station;

deciding a subset of the recognized cluster heads for said station to affiliate with; and allowing said station to concurrently affiliate with at least two cluster heads in the subset, wherein all communications between said station and other stations in the network that are not affiliated with any of the cluster heads with which said station is affiliated are via at least a cluster head with which said station is affiliated and a cluster head with which the other station is affiliated.

16. The method according to claim 15, wherein the affiliation between said station and the at least two cluster heads is asynchronous.

17. The method according to claim 15, wherein an affiliation between said station and a first cluster head is independent of an affiliation between said station and a second cluster head.

18. The method according to claim 15, wherein said deciding step decides which out of the recognized cluster heads to affiliate with by evaluating at least one of a received signal strength from each of the cluster heads, by successful receipt of a predetermined number of beacons from each of the cluster heads, by ranking affiliation options based on administrative function, and by favoring a cluster group based on a number of stations within that cluster group.

19. The method according to claim 15, further comprising a step of commencing operation as a cluster head when affiliation with an existing cluster head is not established.

20. The method according to claim 15, further comprising the step of forwarding the network via any currently affiliated cluster head.

21. The method according to claim 20, further comprising a step of determining for forwarding data messages to the network.

22. The method according to claim 15, wherein each of the communications station, and the communications network is a mobile communications network.

23. The method according to claim 15, further comprising the step of periodically communicating with the network to relay current affiliation information.

24. The method according to claim 15, wherein said station affiliates with two or more cluster heads, and maintains an affiliation with at least one cluster head while changing affiliation with the two or more cluster heads.

25. In a mobile communications network employing a plurality of mobile stations, a method of operating a mobile station so as to automatically configure the plurality of mobile stations into a network for relaying messages from mobile station to mobile station, said method comprising the following steps:

determining possible network access points from said mobile station to the mobile communications network;

attempting to establish a simultaneous communication affiliation between said mobile station and at least two network access points, and establishing simultaneous communication affiliation between said mobile station and the at least two access points if possible, wherein a communication affiliation with each of the at least two access points is independent from the communication affiliations with the other access points; and allowing said mobile station to change network access points, wherein all communications between said mobile station and other mobile stations in the network that are not affiliated with any of the access points with which said mobile station is affiliated are via at least an access point with which said mobile station is affiliated and an access point with which the other mode station is affiliated.

26. Computer executable code stored on a computer readable medium, the code for operating a communications station so as to communicate with a plurality of communications stations in a network in which stations are arranged in clusters having cluster head stations that communicate with other cluster head stations, said computer executable code comprising:

computer executable code to determine a communication state between said station and the cluster head stations of plural clusters;

computer executable code to assign said station to each of the plural clusters as to which a prescribed communication state has been determined between said station and a corresponding cluster head station; and computer executable code to set said station to be in independent communication with each of the plural cluster head stations having the prescribed communication state with said station, wherein all communications between said station and other stations in the network that are not assigned to any of the clusters to which said station is assigned are via at least a cluster head station of a cluster to which said station is assigned and a cluster head station of a cluster to which the other station is assigned.

27. In a mobile communications station for communicating among a plurality of mobile communications stations in a network in which mobile stations are arranged in clusters having cluster head stations that communicate with other cluster head stations, a processor comprising:

means for determining a communication state between said mobile station and the cluster head stations of plural clusters;

means for assigning said mobile station to each of the plural clusters as to which a prescribed communication state has been determined between said mobile station and a corresponding cluster head station; and means for setting said mobile station to be in independent communication with each of the plural cluster head stations having the prescribed communication state with said mobile station, wherein all communications between said mobile station and other mobile stations in the network that are not assigned to any of the clusters to which said mobile station is assigned are via at least a cluster head station of a cluster to which said mobile station is assigned and a cluster head station of a cluster to which the other mobile station is assigned.

28. In a communications station for communicating among a plurality of communications stations in a network in which stations are arranged in clusters having cluster head stations that communicate with other cluster head stations, a processor comprising:

means for determining a communication state between said station and the cluster head stations of plural clusters;

means for assigning said station to each of the plural clusters as to which a prescribed communication state has been determined between said station and a corresponding cluster head station; and means for setting said station to be in independent communication with each of the plural cluster head stations having the prescribed communication state with said station, wherein all communications between said station and other stations in the network that are not assigned to any of the clusters to which said station is assigned are via at least a cluster head station of a cluster to which said station is assigned and a cluster head station of a cluster to which the other station is assigned.

* * * * *

UNITED STATES PATENT AND TRADEMARK OFFICE
CERTIFICATE OF CORRECTION

PATENT NO.    : 6,711,409 B1
DATED         : March 23, 2004
INVENTOR(S)   : Zavgren et al.

It is certified that error appears in the above-identified patent and that said Letters Patent is hereby corrected as shown below:

Column 14,
Line 37, change "cluster head station" to -- cluster head stations --;

Column 15,
Lines 20-21, change "preformed" to -- performed --;
Lines 29 and 33, change "claims 3" to -- claim 3 --;

Column 16,
Line 24, change "forwarding the network" to -- forwarding data messages to the network --;
Line 27, change "determining for forwarding" to -- determining a cluster head for forwarding --;
Line 30, change "communications station" to -- communications stations --;

Signed and Sealed this

Twenty-first Day of September, 2004

JON W. DUDAS
*Director of the United States Patent and Trademark Office*